(12) United States Patent  (10) Patent No.: US 9,242,870 B2
Mongrolle et al.  (45) Date of Patent: Jan. 26, 2016

(54) METHOD OF FORMING A GYPSUM BASED PRODUCT

(71) Applicant: Saint-Gobain Placo SAS, Suresnes (FR)

(72) Inventors: Jean-Louis Mongrolle, Bassens (FR); Jean-Luc Germain, Livry-Gargan (FR)

(73) Assignee: Saint-Gobain Placo SAS (FR)

( * ) Notice: Subject to any disclaimer, the term of this patent is extended or adjusted under 35 U.S.C. 154(b) by 0 days.

(21) Appl. No.: 14/365,342

(22) PCT Filed: Dec. 13, 2012

(86) PCT No.: PCT/EP2012/075353
§ 371 (c)(1),
(2) Date: Jun. 13, 2014

(87) PCT Pub. No.: WO2013/087754
PCT Pub. Date: Jun. 20, 2013

(65) Prior Publication Data
US 2014/0377162 A1 Dec. 25, 2014

(30) Foreign Application Priority Data
Dec. 15, 2011 (GB) .................................. 1121589.4

(51) Int. Cl.
*C01F 11/46* (2006.01)
*C04B 28/14* (2006.01)
*C04B 11/032* (2006.01)
*C04B 111/00* (2006.01)

(52) U.S. Cl.
CPC ............. *C01F 11/466* (2013.01); *C04B 11/032* (2013.01); *C04B 28/146* (2013.01); *C04B 2111/0062* (2013.01)

(58) Field of Classification Search
CPC ................... C04B 2111/0062; C04B 11/032; C04B 28/146; C04B 38/10; C04B 2103/10; E04B 2/00
See application file for complete search history.

(56) References Cited

U.S. PATENT DOCUMENTS

| | | | |
|---|---|---|---|
| 3,423,172 A | 1/1969 | Cafferata et al. | |
| 3,576,599 A * | 4/1971 | Anderson et al. | 423/159 |
| 4,239,716 A * | 12/1980 | Ishida et al. | 264/86 |
| 4,441,840 A * | 4/1984 | Bassier et al. | 405/267 |
| 4,965,031 A | 10/1990 | Conroy | |
| 5,320,677 A * | 6/1994 | Baig | 106/780 |
| 5,520,779 A | 5/1996 | Bold | |
| 5,879,446 A * | 3/1999 | Patel et al. | 106/781 |
| 6,197,235 B1 | 3/2001 | Miller et al. | |
| 7,771,851 B2 * | 8/2010 | Song et al. | 428/703 |
| 8,119,207 B2 | 2/2012 | Rigaudon et al. | |
| 8,517,594 B2 | 8/2013 | Rigaudon et al. | |

(Continued)

FOREIGN PATENT DOCUMENTS

| | | | | |
|---|---|---|---|---|
| CA | 2167978 A1 * | 7/1996 | | C04B 11/024 |
| CN | 102092974 A | 6/2011 | | |

(Continued)

*Primary Examiner* — Timothy Vanoy
(74) *Attorney, Agent, or Firm* — GrayRobinson, P.A.; Michael J. Colitz, III

(57) ABSTRACT

A method of forming a gypsum based product is disclosed. The method comprises the steps of: calcining a mixture of water and gypsum under conditions of raised temperature and pressure within a vessel to produce an alpha-hemihydrate slurry therein; passing the alpha-hemihydrate slurry from the vessel to a mixer for mixing with additional water to produce a settable slurry, which is arranged to set to form the gypsum based product.

17 Claims, 1 Drawing Sheet

(56) References Cited

U.S. PATENT DOCUMENTS

| | | | |
|---|---|---|---|
| 2007/0048549 A1* | 3/2007 | Song et al. | 428/703 |
| 2008/0069762 A1 | 3/2008 | Lynn et al. | |
| 2008/0148998 A1* | 6/2008 | Bruce et al. | 106/772 |
| 2009/0159173 A1 | 6/2009 | Skinner et al. | |
| 2009/0208392 A1* | 8/2009 | Klus | 423/171 |
| 2010/0034727 A1* | 2/2010 | Turkki et al. | 423/555 |

FOREIGN PATENT DOCUMENTS

| | | | | |
|---|---|---|---|---|
| DE | 3927927 | A1 | 2/1991 | |
| DE | 3937429 | A1 | 5/1991 | |
| EP | 0312027 | A2 * | 4/1989 | ............... B28B 1/26 |
| EP | 0572781 | B1 | 9/1996 | |
| EP | 1027970 | B1 | 10/2004 | |
| GB | 1125989 | A | 9/1968 | |
| GB | 2213810 | A | 8/1989 | |
| JP | 63290706 | A | 11/1988 | |
| JP | 01270553 | A | 10/1989 | |
| JP | 02160620 | A * | 6/1990 | ............... C01F 11/46 |
| JP | 1076911 | A | 3/1998 | |
| WO | 2007084346 | A2 | 7/2007 | |
| WO | 2008115929 | A1 | 9/2008 | |

* cited by examiner

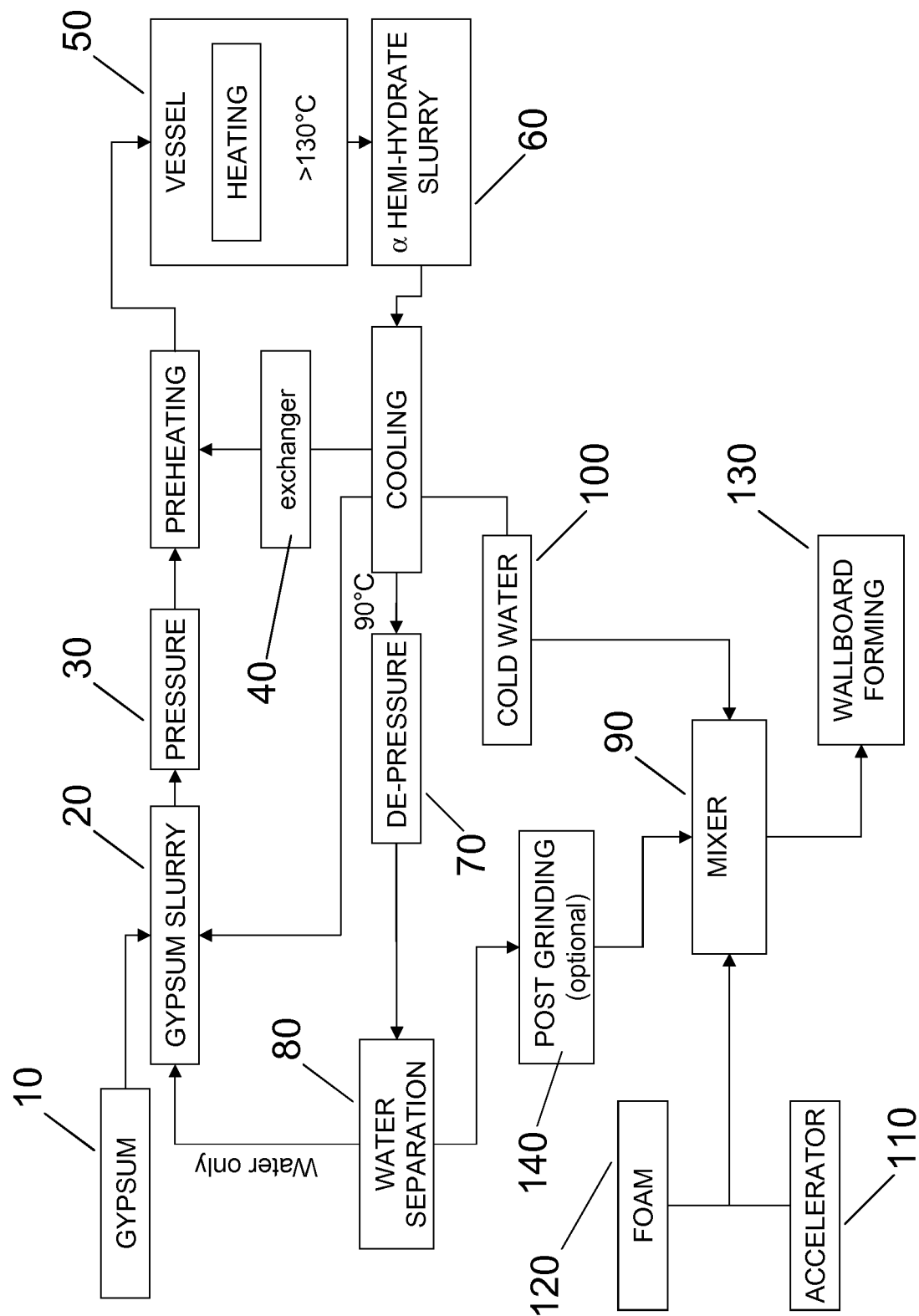

METHOD OF FORMING A GYPSUM BASED PRODUCT

The present invention relates to a method of forming a gypsum based product.

Gypsum occurs naturally as a raw material in the form of calcium sulphate dihydrate. Gypsum containing products, such as plasterboard, are prepared by forming a mixture of calcined or dehydrated gypsum, namely calcium sulphate hemihydrate, with water, to form a settable slurry which is then cast into a pre-determined shape. The hemihydrate reacts with the water and becomes re-hydrated to the dihydrate crystal, which is then cured or dried to the solid state.

The hemihydrate form of gypsum is known to depend on the calcination process, and is categorised into two basic forms, the alpha-hemihydrate and the beta-hemihydrate. The beta-hemihydrate is typically formed by heating gypsum under atmospheric conditions, to drive off any moisture and chemically combined water to form dried crystals, which may then be ground to a fine powder. The beta-hemihydrate has long been the favoured hemihydrate in the production of gypsum wall boards or plasterboards, owing to the rapid re-hydration of the ground crystal in forming the slurry. However, the gypsum product derived from the beta-hemihydrate is typically soft and the beta-hydrate requires large volumes of water to produce the required slurry fluidity.

The alpha-hemihydrate is formed by heating gypsum under pressure to similarly remove the water associated therewith. The gypsum product derived from the alpha-hemihydrate however, is found to be harder and comprises a higher strength and density compared with beta-hemihydrate derived gypsum.

It is necessary to use substantial amounts of water in gypsum slurries in order to ensure proper flowability of the slurry. Unfortunately, most of this water must eventually be driven off by heating, which is expensive due to the high cost of the fuels used in the heating process. The heating step is also time-consuming. It is known that alpha-hemihydrate has a substantially lower water demand than beta-hemihydrate, meaning that if alpha-hemihydrate could be used in making wallboard, it would substantially reduce the water demand and hence the expense and time required to produce the wallboard. This is a further advantage associated with alpha-hemihydrate.

However, alpha-hemihydrate is not generally used commercially in the production of gypsum wallboard primarily due to its slower hydration rate compared to beta-hemihydrate, which would therefore require a slower passage of boards along the production line.

WO2007/084346 discloses a method for the production of alpha-type gypsum. A gypsum slurry is delivered into an autoclave, where it is heated typically to a temperature of about 280° F. (about 137° C.) under a pressure of 3-4 Bar and converted to alpha hemihydrate. The slurry exits the autoclave via a pressure let down valve and is delivered to a flash tank, where it is cooled and excess steam is collected.

US2008/0069762 discloses a process for making a blend of alpha- and beta-stucco. The process includes a slurry calcination step in which gypsum slurry is held in a reactor at a temperature of e.g. 149° C. and a pressure of e.g. 3.4 to 4.8 Bar. The partially calcined gypsum product discharges from the reactor as a slurry comprising calcium sulphate dihydrate and alpha calcium sulphate hemihydrate and feeds an accumulator tank, which acts as a holding tank and permits release of the steam as the slurry's pressure drops to atmospheric pressure. The slurry then discharges from the accumulator tank and feeds a de-watering unit which removes water to produce a dewatered solids-containing product and a removed water stream. The dewatered product has a 2-6 wt % free water moisture content. The dewatered product is fed to a board stucco kettle calciner at conditions to convert the majority or all of the gypsum in the dewatered product to beta calcium sulphate hemihydrate.

BRIEF DESCRIPTION OF THE DRAWING

FIG. 1 is a chart illustrating the method of the present invention.

In accordance with the present invention as seen from a first aspect, there is provided a method of forming a gypsum based product, the method comprising the steps of:
  calcining a mixture of water and gypsum under conditions of raised temperature and pressure within a vessel to produce an alpha-hemihydrate slurry therein;
  passing the alpha-hemihydrate slurry from the vessel to a mixer for mixing with additional water to produce a settable slurry, which is arranged to set to form the gypsum based product.

Advantageously, the method eliminates the requirement for drying of the hemihydrate, which is associated with the conventional formation of the settable slurry, and therefore reduces the energy demands of the method. Moreover, the reduced water amounts associated with achieving the desired fluidity of alpha-hemihydrate settable slurry compared with beta-hemihydrate, provides a further energy saving since less water must be removed during the drying of the gypsum product.

Preferably, the calcination step comprises substantially filling the vessel with water and gypsum so that the vessel is substantially devoid of free space, such that the water produced during the calcination of gypsum is prevented from evaporating.

Preferably, the raised temperature comprises a temperature within the range between 110° C. and 170° C., preferably between 120° C. and 150° C., more preferably between 130° C. and 140° C.

Typically, the pressure is adjusted in accordance with the operating temperature, such that the operating pressure corresponds to the vapour pressure of steam at the operating temperature. Preferably, the raised pressure comprises a pressure within the range 2-8 Bars, more preferably 3-5 Bars.

The method preferably further comprises the step of cooling the alpha-hemihydrate slurry after the calcination step. Typically, the step of cooling the alpha-hemihydrate slurry takes place while the alpha-hemihydrate slurry is still held at the raised pressure of about 2 to 8 Bars. Typically, the step of cooling the alpha-hemihydrate slurry is carried out using a heat exchanger. Preferably, the alpha-hemihydrate is cooled to a temperature less than 100° C., such as 90° C.

Preferably, after the step of cooling the alpha-hemihydrate slurry, the slurry is de-pressured to a pressure of 1 Bar (i.e. atmospheric pressure).

Typically, the method further comprises the step of substantially separating the water from the alpha-hemihydrate slurry after the step of reducing the pressure acting on the alpha-hemihydrate slurry. This may be done e.g. using a belt filter or a centrifugal separator, i.e. hydroclone. Preferably, in this case, the separated water is circulated for mixture with a fresh quantity of gypsum, for introducing into the vessel to start a further calcination process. In this case, the heat energy contained within the separated water reduces the requirement for heating of the vessel to achieve the raised temperature of e.g. 110° C. to 180° C.

In the case that water is separated from the alpha-hemihydrate slurry, the free water content of the remaining slurry is typically 1-30 wt %, preferably 5-30 wt %, more preferably 8-30 wt %.

Preferably, the method further comprises the step of grinding the alpha-hemihydrate slurry to reduce the size of particulates therein. It is thought that grinding of the alpha-hemihydrate slurry results in a greater reactivity of the alpha-hemihydrate particles, so as to increase the hydration rate of the alpha-hemihydrate particles during the step of forming a settable slurry. The step of grinding the alpha-hemihydrate slurry may be carried out using wet grinding techniques. In this case, the grinding may be carried out at a temperature of 50° C. or more, preferably 70° C. or more, more preferably 80° C. or more.

Methods for controlling the size of the alpha-hemihydrate particles during the calcination stage are known in the art and may be used as an alternative or in addition to the grinding step.

Preferably, during the step of passing the alpha-hemihydrate slurry from the calcination vessel to the mixer, the temperature of the alpha-hemihydrate slurry is maintained at 70° C. or more. By maintaining the temperature of the alpha-hemihydrate slurry at this level, it is thought that hydration of the alpha-hemihydrate particles to form a settable gypsum product may be avoided until entry of the alpha-hemihydrate slurry into the mixer. Preferably, the temperature of the alpha-hemihydrate slurry is maintained at over 80° C., more preferably over 85° C.

In addition, it is desirable that the step of passing the alpha-hemihydrate slurry from the calcination vessel to the mixer should not take too long, so as to further avoid hydration of the alpha-hemihydrate particles until entry of the particles into the mixer. Typically the time taken for the alpha-hemihydrate slurry to pass from the calcination vessel to the mixer is less than 120 minutes, preferably less than 60 minutes, more preferably less than 30 minutes.

It is thought that the addition of cold water (e.g. about 20° C.-30° C.) in the mixer, for mixing with the alpha-hemihydrate slurry will rapidly decrease the temperature of the alpha-hemihydrate slurry, so as to promote the hydration of the alpha-hemihydrate particles to form a settable gypsum product.

The method further comprises the addition of one or more further additives to the hemihydrate slurry within the mixer, such as accelerators and foaming agents.

Preferably, the gypsum based product comprises a gypsum board.

In accordance with the present invention as seen from a second aspect, there is provided a method of forming a gypsum based product, the method comprising the steps of:
  calcining a mixture of water and gypsum under conditions of raised temperature and pressure within a vessel to produce an alpha-hemihydrate slurry therein;
  passing the alpha-hemihydrate slurry from the vessel to a mixer for mixing with additional water to produce a settable slurry, which is arranged to set to form the gypsum based product, wherein the alpha-hemihydrate slurry is passed from the vessel to the mixer without undergoing a drying stage.

Preferred features of the method of the second aspect may comprise one or more of the preferred features of the method of the first aspect.

An embodiment of the present invention will now be described by way of example only and with reference to the accompanying drawing which provides a schematic illustration of the steps associated with the method according to an embodiment of the present invention.

Referring to the drawing, the method according to an embodiment of the present invention comprises the initial step of forming a mixture 20 of water and gypsum 10 in a ratio of approximately 1 part gypsum to 1.5 parts water, pressurising the mixture in a pressuriser 30 and pre-heating it by means of a heat exchanger 40 (e.g. a water/water heat exchanger). The mixture is then introduced into a calcination vessel 50, e.g. by means of a pump or in a long water column. The mixture is subsequently heated to a temperature in the range 130° C.-140° C. and the vessel 50 is pressurised to a pressure in the range 3-5 Bars. The vessel 50 is substantially filled with the mixture to remove any free space therein, such that the water within the vessel 50 and principally the water derived from the calcining of the gypsum, is prevented from evaporating and thus escaping from the vessel 50.

Following the calcination stage the resulting mixture of water and alpha-hemihydrate slurry 60 is cooled to a temperature of approximately 90° C. using the heat exchanger 40, de-pressurised in a de-pressuriser 70 and passed to a separation unit 80, wherein the hemihydrate slurry is substantially separated from the water. The water is circulated from the separation unit 80 back to the vessel 50 to preheat subsequent water and gypsum before entering the vessel 50 and thus reduce the energy demands associated with the heating of the mixture. The alpha-hemihydrate slurry comprising approximately 6% water is passed from the separation unit 80 to a mixer 90, for subsequent post processing of the slurry which includes the addition of water 100 and optional additives, such as accelerators 110 (for reducing the setting time) and foaming agents 120 to produce a settable slurry. It is also envisaged however, that the post processing may further comprise the grinding of the hemihydrate slurry (e.g. in a screw grinder 140) to reduce the size of particulates disposed therein before the alpha-hemihydrate slurry is introduced into the mixer 90. In this respect, the hemihydrate slurry is passed to the mixer 90 to achieve the required fluidity and setting characteristics, without undergoing any drying stage, thereby reducing the energy demand in producing the gypsum product. Moreover, the resulting settable slurry comprising 30-40% water which is then passed to a production line 130 for subsequent preparation of a gypsum product such as a plasterboard, will require less curing owing to reduced amounts of water which are required to attain the desired fluidity of the alpha-hemihydrate settable slurry, compared with the amount of water required to attain the desired fluidity of a beta-hemihydrate settable slurry. Since alpha-hemihydrate typically has a slower hydration rate than beta-hemihydrate, the setting times for alpha-hemihydrate slurry are typically longer than for beta-hemihydrate slurry. Thus, in the manufacture of gypsum boards, it is generally desirable when using alpha-hemihydrate slurry, to have a longer forming belt to provide sufficient time for setting of the slurry.

The invention claimed is:

1. A method of forming a gypsum based product, the method comprising the steps of:
  calcining a mixture of water and gypsum under conditions of raised temperature and pressure within a vessel to produce an alpha-hemihydrate slurry therein;
  passing the alpha-hemihydrate slurry from the vessel to a mixer, adding additional water to the mixer, mixing the alpha-hemihydrate slurry and additional water to produce a settable slurry, which is arranged to set to form the gypsum based product.

2. A method according to claim 1 further comprising the step of reducing the water content of the alpha-hemihydrate slurry to provide a separate water stream from the alpha-hemihydrate slurry.

3. A method according to claim 1, wherein the calcination step comprises substantially filling the vessel with water and gypsum so that the vessel is substantially devoid of free space, such that the water produced during the calcination of gypsum is prevented from evaporating.

4. A method according claim 1, wherein the raised temperature comprises a temperature within the range 110° C. to 170° C.

5. A method according to claim 1, wherein the raised pressure comprises a pressure within the range 2 to 8 Bars.

6. A method according to claim 1, further comprising the step of cooling the alpha-hemihydrate slurry after the step of calcining the mixture of water and gypsum.

7. A method according to claim 6, wherein the alpha-hemihydrate slurry is cooled to a temperature less than 100° C.

8. A method according to claim 6, comprising the further step, after the step of cooling the alpha-hemihydrate slurry, of de-pressurizing the slurry.

9. A method according to claim 8 further comprising circulating the separated water stream to preheat further gypsum before entering the vessel.

10. A method according to claim 8, wherein after the step of reducing the water content of the alpha-hemihydrate slurry, the water content of the alpha-hemihydrate slurry lies within a range of 1-10 wt %.

11. A method according to claim 1, further comprises the step of grinding the alpha-hemihydrate slurry to reduce the size of particulates therein.

12. A method according to claim 1, wherein the step of passing the alpha-hemihydrate slurry from the vessel to the mixer comprises the step of maintaining the temperature of the alpha-hemihydrate slurry at over 70° C.

13. A method according to claim 1, wherein the time taken for the alpha-hemihydrate slurry to pass from the vessel to the mixer is less than 120 minutes.

14. A method according to claim 1, further comprising adding water to the hemihydrate slurry.

15. A method according to claim 14, further comprising the addition of one or more additives to the hemihydrate slurry within the mixer.

16. A method according to claim 1, wherein the gypsum based product comprises a gypsum board.

17. A method of forming a gypsum based product, the method comprising the steps of:
 calcining a mixture of water and gypsum under conditions of raised temperature and pressure within a vessel to produce an alpha-hemihydrate slurry therein;
 passing the alpha-hemihydrate slurry from the vessel to a mixer for mixing with additional water to produce a settable slurry, which is arranged to set to form the gypsum based product, wherein the alpha-hemihydrate slurry is passed from the vessel to the mixer without undergoing a drying stage.

* * * * *